United States Patent [19]

Harsy

[11] 4,294,175

[45] Oct. 13, 1981

[54] SWIVEL-TRUCK SPRING SYSTEM FOR RAILROAD USE

[75] Inventor: Gabor Harsy, Neuhausen, Switzerland

[73] Assignee: Sig Schweizerische Industrie-Gesellschaft, Switzerland

[21] Appl. No.: 26,405

[22] Filed: Apr. 2, 1979

[30] Foreign Application Priority Data

Apr. 10, 1978 [CH] Switzerland .......................... 3819/78

[51] Int. Cl.³ ........................... B61F 3/08; B61F 5/30
[52] U.S. Cl. ........................... 105/199 R; 105/197 A; 105/197 B; 105/218 A; 267/4
[58] Field of Search ........... 105/182 R, 197 A, 199 R, 105/197 B, 218 A; 267/3, 4, 9

[56] References Cited

U.S. PATENT DOCUMENTS

| | | | |
|---|---|---|---|
| 2,562,573 | 7/1951 | Piron | 105/182 R |
| 3,223,400 | 12/1965 | Deister, Jr. | |
| 3,343,830 | 9/1967 | Dean et al. | |
| 3,908,559 | 9/1975 | Fromm | 105/182 R |
| 4,067,262 | 1/1978 | Scheffel | 105/182 R |
| 4,108,080 | 8/1978 | Garner | 105/182 R |

FOREIGN PATENT DOCUMENTS

| | | |
|---|---|---|
| 1213468 | 3/1966 | Fed. Rep. of Germany . |
| 1605132 | 7/1970 | Fed. Rep. of Germany . |
| 1120480 | 7/1956 | France . |

*Primary Examiner*—Richard A. Bertsch
*Attorney, Agent, or Firm*—Ostrolenk, Faber, Gerb & Soffen

[57] ABSTRACT

This disclosure concerns a spring system between the body of a railroad car and the wheel supporting truck. The spring system includes a coil spring for absorbing vertical forces and includes a rubber layer spring for absorbing lateral forces, the latter resulting from lateral impact and movement of the railway car along curves in the track. The last mentioned rubber spring is coaxial with and placed inside the first-mentioned coil spring, thereby minimizing the vertical height of the spring system. A pair of spring washers extends laterally between the car body and the truck. The spring washers are held apart by the coil spring. The rubber spring is divided between a first section above the upper spring washer and the undercarriage of the car and a second section beneath the lower spring washer and the frame of the truck. The spring washers have a plurality of troughs for receiving a plurality of sets of springs. For rigidifying purposes, the spring washers on opposite sides of the truck are held together by rigidifying bars.

25 Claims, 4 Drawing Figures

SWIVEL-TRUCK SPRING SYSTEM FOR RAILROAD USE

BACKGROUND OF THE INVENTION

The invention relates to a truck for a railroad car, or the like, and more particularly to the elastic connection between the railroad car, or the like, and the truck.

Various elastic connections between the body and the swivelable truck of a railroad car are known. These comprise steel coil springs and rubber thrust springs that are connected in series. See, for instance, German Provisional Pat. (Auslegeschrift) No. 23 13 887. These spring systems permit deflection and cause elastic restoration along three components of movement, namely the lifting motion of the truck as a result of vertical impacts, the transverse movement of the truck in the case of lateral impacts, and the expected rotary movement of the swivelable truck with respect to the car body on curves in the track.

Known series connected spring systems have various defects. The different spring elements are arranged one above the other. This produces a large structural height for the spring system and thus frequently requires that a costly offset be constructed in the frame of the swivel truck and/or that corresponding recesses be formed in the bottom of the car body. This either reduces the strength of the structural parts or increases their weight. Another disadvantage is that there is a high stress on the coil springs with the danger of instability of the spring system, especially if there is a relatively large horizontal spring movement with only a moderate restoring force available from the spring system.

SUMMARY OF THE INVENTION

The object of the present invention is to provide a swivel-truck spring system for a railroad car or the like, which is of relatively short structural height, which permits a swivel-truck frame that is of simple shape to be used and which satisfies the spring system strength requirements with the lowest possible weight.

As a further object of the invention, the spring system should also be stable and strongly resist breakage, even upon maximum deflections.

A swivel-truck spring system according to the invention is placed between the body of the railroad car, or the like, and the truck. The truck has wheels thereon by which the car is moved. The spring system includes first spring means for absorbing vertical load force, e.g. vertical impacts, and separate second spring means for absorbing lateral or horizontal load forces, from lateral impacts or from the car moving around a curve in the track. The first and second spring means are arrayed in series. In order for the height of the spring system to be as short as possible, the first and second spring means are adjacent to each other laterally. In the preferred embodiment, they are coaxial, with the second spring means being positioned inside the first spring means. The first spring means is preferably a coil steel spring. The second spring means is preferably a rubber layer spring, comprised of an integrated stack of a plurality of rubber discs.

There is a respective set of spring means on each side of the truck, near each railroad track.

A respective washer system is provided for each set of spring means. Each washer system is comprised of two vertically spaced apart washers. The first spring means is positioned between the washers and serves to hold them apart. The second spring means includes an upper portion between the upper washer and the undercarriage of the car and a second spring between the lower washer and the frame of the truck. Thus, the first and second spring means are in series between the undercarriage of the car and the frame of the truck. The washers themselves are profiled, e.g. by having troughs therein, so as to receive the springs and to position them in the coaxial condition described. In the preferred version, the washers are spring washers. In the preferred version also, each spring washer extends along the length of the truck and defines trough means therein for receiving two complete sets comprised of first and second spring means. For rigidification of this structure, the washers on opposite sides of the trucks may be joined together by appropriate rigidifying support elements.

Other objects and features of the invention are explained below with reference to the accompanying drawings.

DESCRIPTION OF THE PREFERRED EMBODIMENTS

Figure 1:
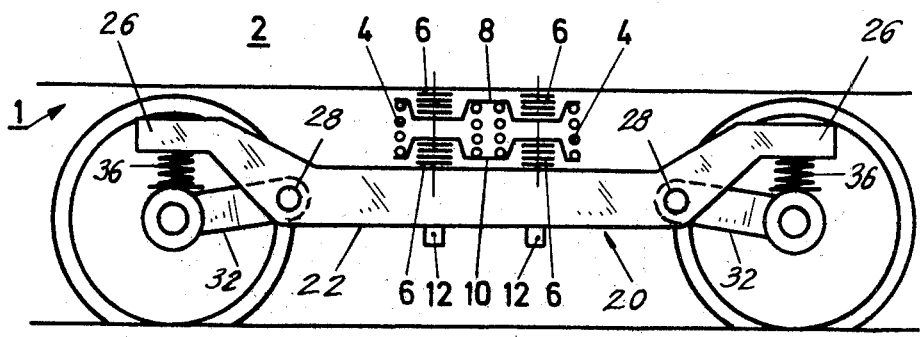
FIG. 1 is a side elevational of a swivel-truck of a railroad car.

The body 2 of a railroad car, or the like, rides on a plurality of swivelable trucks, one located toward each end of the car. Each truck includes a rigid frame 20, which is generally H-shaped, with two spaced apart sides 22 joined by a crossbar 24. At the forward and rearward ends of each side 22 are the elevated abutment arms 26, for holding down the wheels. Connected at the pivots 28 on the sides 22 are the pivotable, axle support levers 32, which are pivotable about pivots 28.

Wheel axles 34 are received in appropriate bearings in arms 26, so that the levers 32 may swivel with respect to the axles 34 and so that the axles may also rotate with the wheels. Respective coiled compression springs 36 are positioned between the undersides of the arms 26 and the respective axles 34. These cushion the ride on the bearings of the axles 34 and space the axles 34 at a desired vertical height with respect to the truck frame 20.

The wheel assembly 38 comprised of two flanged wheels 40, spaced apart by the connecting sleeve 42, is supported to rotate on the axle 34 as the axle 34 rotates together with the wheel assembly.

The truck 1 is joined to the railroad car body 2 through four spring systems on the swivel-truck 1. Each spring system includes a steel coil compression spring 4 and includes two vertically aligned, adjacent, but laterally spaced apart, rubber layer springs 6 which are oriented radially inside the spring 4 and coaxial therewith. Each spring 6 is comprised of an integral stack of rubber discs, which may be annular in shape to facilitate lateral shifting. The spring 4 and springs 6 of each spring system are in series.

Figure 2:
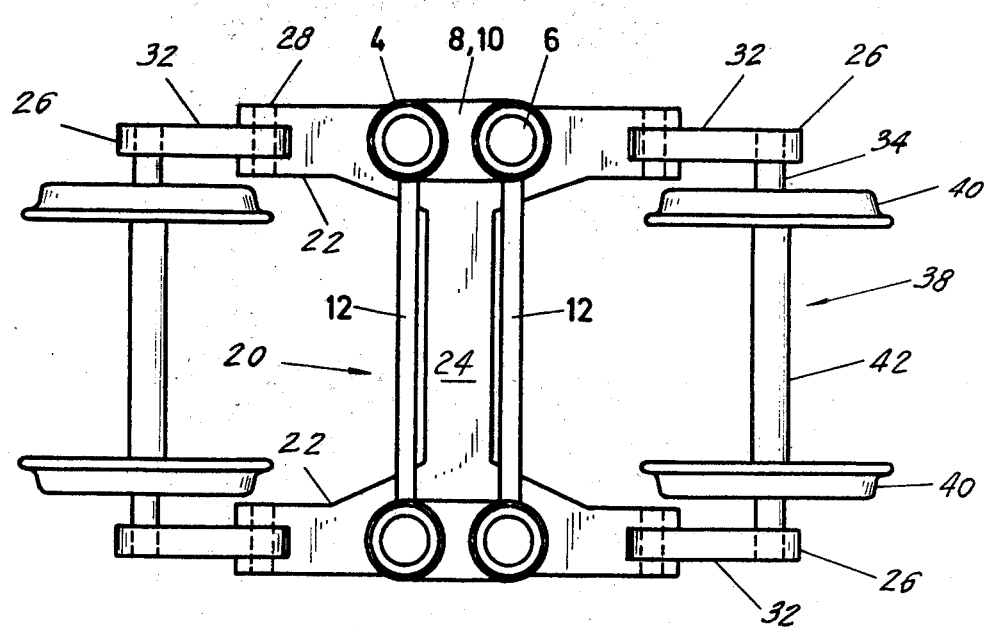
FIG. 2 is a plan view showing parts of the swivel-truck of FIG. 1.

Each spring system includes two vertically spaced apart and aligned, generally trough-shaped spring washers 8, 10 which connect the rubber springs 6 and the steel spring 4. Each spring washer 8 and 10 extends along its side 22 of the truck frame and it has the corrugated cross-sectional profile shown in FIG. 1, and includes the circular troughs for springs 6 and the annular troughs for springs 4, as shown in FIG. 2, so that the springs may be properly positioned. Each set of the spring washers 8, 10 supports two sets of springs 4, 6. The coil springs 4 hold the respective spring washers 8, 10 apart. Each upper rubber layer spring 6 joins the car body 2 with the upper spring washer 8. Each other, lower rubber layer spring 6 joins the lower spring washer 10 with the truck frame 20. Thus, each spring system 4,6 is connected in series between the car body 2 and the truck frame 20.

The four and four lower spring washers 8 and 10 on each side of the truck may be respectively connected with each other by cross members 12 in order to stabilize the motion of the car. The individual spring elements 4, 6 and the spring washers 8, 10 are so dimensioned and shaped that the rubber layer springs 6 are freely movable substantially within the coil springs 4.

Figure 4:
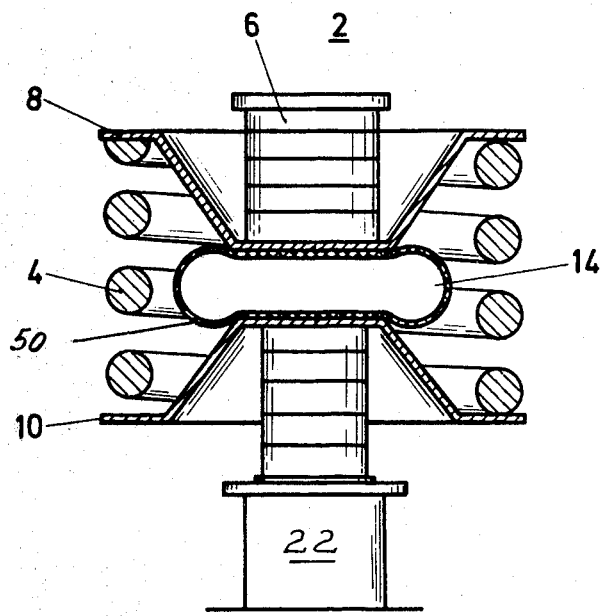
FIG. 4 is the same type of view of a variant of the embodiment shown in FIG. 3.

In the embodiment shown in FIG. 4, additional hydraulic, gas filled chamber or the like, springs 14 are provided between the upper and lower spring washers 8 and 10. These springs have the characteristic that their pressure can be controlled as a function of the load in the car 2, by conventional hydraulic pressure means 50, thus permitting regulation of the vertical position of the car and the spring hardness.

Upon complete compression of the coil springs 4, the upper and lower spring washers 8, 10 will contact each other. Together with the rubber springs 6, the spring washers thereby form an elastic limit-stop, and they also guarantee certain emergency operating properties in case of the failure of a spring element.

Figure 3:
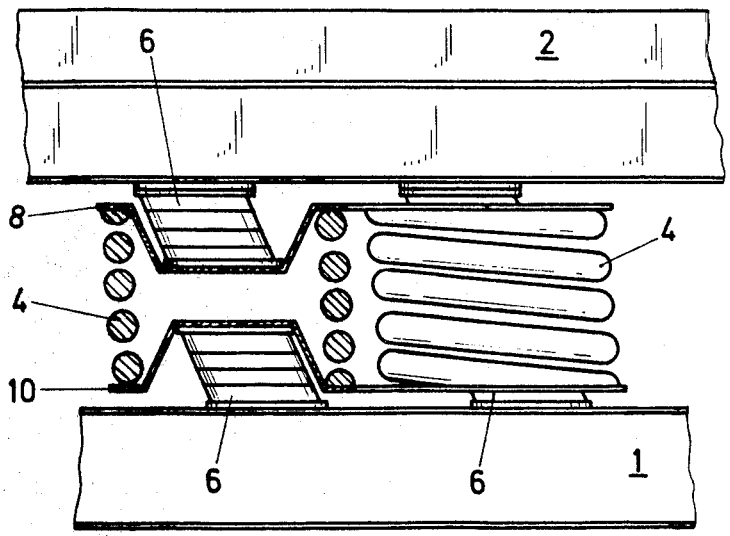
FIG. 3 is an enlarged fragmentary view, partly in cross-section, of a portion of a swivel-truck spring system.

FIG. 3 shows the condition wherein the truck has been laterally or horizontally stressed, while under load, as might occur from lateral impact or movement of the car along a curve in the track. The steel coil springs 4 take up practically the entire lift movement for spring supporting the load, while the rubber-layer springs 6 take up the main portion of the horizontal movement. Under horizontal direction stress, the coil springs 4 are pushed and stressed laterally only to a slight extent.

The different functional properties of the spring elements 4, 6, 8, 10 make it possible, by suitable dimensionsing of these elements, to obtain desired spring properties for the entire system. Furthermore, bending out of the springs upon lateral movements is prevented.

The low structural height of the spring system of the invention makes it possible to use simple, straight continuous girders on the swivel-truck frame 22 and on the car body undercarriage, which leads to a simple, light, and economical construction of these essential parts of the vehicle.

Although the present invention has been described in connection with the preferred embodiments thereof, many variations and modifications will now become apparent to those skilled in the art. It is preferred, therefore, that the present invention be limited not by the specific disclosure herein, but only by the appended claims.

According to emergency cases it is very important to know that in fact the present construction allows running even if one of the steel springs gets broken or the carriage is overloaded. This is also true for a defect of an additionally built in pneumatic spring, a so-called "gasspring", in which case the rubber lamellar springs have elastic stops, an emergency-run possibility and this without any additional special emergency-springs which is usual in other and known constructions.

What is claimed is:

1. A swivel truck spring system for a railroad car, or the like, comprising:
   a truck, including a frame and rotatable wheels supported on said frame;
   first and second spring means arranged in series between said truck frame and the body of the railroad car, with said first spring means being adapted for absorbing vertical load forces and with said second spring means being adapted for absorbing lateral load forces;
   said first and said second spring means being laterally spaced apart and being near each other, thereby to take up both vertical and lateral forces, while minimizing the height of the combined structure of said first and said second spring means;
   a pair of normally spaced apart spring washers for each set of said first and said second spring means; said spring washers extending laterally between said truck frame and the body of the railroad car, or the like; said first spring means being between said spring washers and said second spring means comprising one second spring between the uppermost said washer and the car body and another second spring between the lowermost said washer and said truck frame.

2. The swivel truck spring system of claim 1, wherein said first spring means comprises a coil spring of steel and said second spring means comprises a rubber layer spring.

3. The swivel truck spring system claim 1, wherein said first and said second spring means are coaxial.

4. The swivel truck spring system of claim 3, wherein said second spring means is radially inside said first spring means.

5. The swivel truck spring system of claim 4, wherein each said washer has respective troughs defined therein for both said first and said second spring means to be received therein, such that with said first and said second spring means in the respective said troughs, they are coaxial.

6. The swivel truck spring system of claim 5, wherein said truck frame has opposite lateral sides, and there is a respective said first and said second spring means at each said truck frame side.

7. The swivel truck spring system of claim 6, wherein said washers on opposite sides of said truck are connected together by crossbar means.

8. The swivel truck spring system of claim 3, wherein said truck frame has opposite sides, each near a respective railway track, and there is a respective said first and said second spring means at each said truck frame side.

9. The swivel truck spring system of claim 8, further comprising an hydraulic spring between said washers and adapted to be adjustable in spring force for adjusting the height of the car body.

10. The swivel truck spring system of claim 8, wherein said washers are shaped and placed such that they may rest on and support each other upon vertical load thereupon being sufficient and upon said first spring means not applying force enough to keep said washers apart.

11. The swivel truck spring system of claim 8, wherein each said upper and lower washer in a set of said washers extends along said frame, such that there are, between each pair of said washers in a said set thereof, two laterally spaced apart sets, comprised of a said first and a said second spring means.

12. The swivel truck spring system of claim 11, wherein said washers are shaped and placed such that they may rest on and support each other upon vertical load thereupon being sufficient and upon said first spring means not applying force enough to keep said washers apart.

13. A swivel truck spring system for a railroad car, or the like, comprising:
- a truck, including a frame and rotatable wheels supported on said frame;
- first and second spring means arranged in series between said truck frame and the body of the railroad car, with said first spring means being adapted for absorbing vertical load forces and with said second spring means being adapted for absorbing lateral load forces;
- said first and said second spring means being laterally spaced apart and being near each other, thereby to take up both vertical and lateral forces, while minimizing the height of the combined structure of said first and said second spring means;
- a pair of normally spaced apart washers for each set of said first and said second spring means; said washers extending laterally between said truck frame and the body of the railroad car, or the like; said first spring means being between said washers and said second spring means comprising one second spring between the uppermost said washer and the car body and another second spring between the lowermost said washer and said truck frame.

14. The swivel truck spring system of claim 13, wherein said truck frame has opposite lateral sides, and there is a respective said first and said second spring means at each said truck frame side.

15. The swivel truck spring system of claim 14, wherein said washers on opposite sides of said truck are connected together by crossbar means.

16. The swivel truck spring system of claim 14, wherein said washers are shaped and placed such that they may rest on and support each other upon vertical load thereupon being sufficient and upon said first spring means not applying force enough to keep said washers apart.

17. The swivel truck spring system of claim 14, further comprising an hydraulic spring between said washers and adapted to be adjustable in spring force for adjusting the height of the car body.

18. The swivel truck spring system of claim 13, wherein each said upper and lower washer in a set of said washers extends along said frame, such that there are, between each pair of said washers in a said set thereof, two laterally spaced apart sets, comprised of a said first and a said second spring means.

19. The swivel truck spring system of claim 18, wherein said truck frame has opposite lateral sides, and there is a respective said first and said second spring means at each said truck frame side.

20. The swivel truck spring system of claim 19, wherein said washers are shaped and placed such that they may rest on and support each other upon vertical load thereupon being sufficient and upon said first and said second spring means not applying force enough to keep said washers apart.

21. The swivel truck spring system of claim 13, wherein each said washer has respective troughs defined therein for both said first and said second spring means to be received therein, such that with said first and said second spring means in the respective said troughs, they are laterally adjacent.

22. The swivel truck spring system of claim 21, wherein each said upper and lower washer in a set of said washers extends along said frame, such that there are, between each pair of said washers in a said set thereof, two laterally spaced apart sets, comprised of a said first and a said second spring means.

23. The swivel truck spring system of claim 21, wherein said washers on opposite sides of said truck are connected together by crossbar means.

24. The swivel truck spring system of claim 13, wherein each said upper and lower washer in a set of said washers extends along said frame, such that there are, between each pair of said washers in a said set thereof, two laterally spaced apart sets, comprised of a said first and a said second spring means.

25. The swivel truck spring system of claim 13, further comprising an hydraulic spring between said washers and adapted to be adjustable in spring force for adjusting the height of the car body.

* * * * *